United States Patent [19]

Orihara et al.

[11] Patent Number: 5,879,646
[45] Date of Patent: Mar. 9, 1999

[54] TREATMENT OF NH₃-CONTAINING GASES

[75] Inventors: Ithuo Orihara; Moriyuki Fukushima; Eisaku Mogi; Shiro Yamashita, all of Gunma-ken, Japan

[73] Assignee: Kanto Denka Kogyo Co., Ltd., Tokyo, Japan

[21] Appl. No.: 771,834

[22] Filed: Dec. 23, 1996

[30] Foreign Application Priority Data

Oct. 15, 1996 [JP] Japan .................................. 8-272353

[51] Int. Cl.⁶ .................................................. B01D 53/54
[52] U.S. Cl. ..................................... 423/239.1; 423/240 S
[58] Field of Search ............................ 423/239.1, 240 S; 420/34

[56] References Cited

U.S. PATENT DOCUMENTS

| | | | |
|---|---|---|---|
| 4,193,976 | 3/1980 | Lileck et al. | 423/240 S |
| 4,784,984 | 11/1988 | Yamanaka et al. | 428/607 |
| 4,948,571 | 8/1990 | Harada et al. | 423/240 S |
| 4,964,137 | 10/1990 | Aramaki et al. | 372/59 |
| 5,165,899 | 11/1992 | Delaunay et al. | 420/34 |
| 5,176,889 | 1/1993 | Yoshino et al. | 423/240 S |
| 5,183,647 | 2/1993 | Harada et al. | 423/239.1 |
| 5,417,948 | 5/1995 | Iwata | 423/239.1 |

FOREIGN PATENT DOCUMENTS 5-23814  4/1993  Japan .

*Primary Examiner*—Michael Lewis
*Assistant Examiner*—Peter DiMauro
*Attorney, Agent, or Firm*—Browdy and Neimark

[57] ABSTRACT

A waste gas stream containing toxic $NF_3$ and optionally other gases, such as acidic fluoride gases, for example, HF, $SiF_4$, $MoF_6$ and $WF_6$ is first treated with particles or ribbons of a Cr-containing Fe alloy at about 300°–600° C. to remove the $NF_3$ content and, if desired, subsequently with an alkaline neutralizing agent in the form of pellets to remove the acidic fluoride contents, if any; said alloy containing preferably about 16–26% Cr and being used in a form of bed packed with said ribbons.

18 Claims, No Drawings

TREATMENT OF NH$_3$-CONTAINING GASES

BACKGROUND OF THE INVENTION

This invention relates to treatment of waste gases contaminated with nitrogen trifluoride, NF$_3$. In particular, the invention relates to a process for treating a gaseous stream comprising NF$_3$ and optionally other acidic gaseous fluoride substances and to a reducing agent comprising an Fe—Cr-containing alloy useful for destroying NF$_3$ in such a process.

Nitrogen trifluoride, NF$_3$, has been very useful as an oxidizer for high-energy fuels used in rocketry or the like and as a fluorine source for a certain type of chemical laser. Recently, NF$_3$ has been conveniently employed as a dry-etching gas as well as a cleaning gas in the very large scale integration (VLSI) industry, because it does not leave any harmful residues after etching and cleaning treatments.

Normally, NF$_3$ is present as a nonflammable gas that is very stable and nonreactive with water, acids and aqueous alkalis. However, it is a toxic substance having a threshold limit value, TLV, of 10 ppm. Therefore, it is necessary to treat hazardous NF$_3$-containing gases to eliminate or substantially reduce the toxicity before releasing the used gases into the environment. For this purpose, the following two methods have been proposed.

i) Method for treating the contaminated gases with hot metals:

In this method, NF$_3$ is allowed to react with a metallic material at raised temperatures to produce a metal fluoride. If the fluoride is a solid substance forming a coating on the surface of the metallic material, the reaction is inhibited by growth of the coating so that the capacity of decomposing the NF$_3$ contaminant becomes seriously hindered after a short period. On the other hand, if a powdery or flaky fluoride is produced by the reaction between NF$_3$ and the metal, then the powder tends to block the treatment vessel and pipings. If the product fluoride is gaseous, the gas should be subjected to an appropriate secondary treatment, such as physical absorption, scrubbing or the like, requiring a larger apparatus as a whole and incurring additional operation costs. The gaseous fluoride product may generally be corrosive to the treatment apparatus, giving rise to another serious problem.

ii) Method for treating the contaminated gases with active carbon at raised temperatures:

When this method is carried out above 400° C., the contaminant NF$_3$ can be decomposed relatively effectively, but this is accompanied with a large proportion of a by-product dinitrogen difluoride, N$_2$F$_2$, which itself is highly toxic and also detonative. In order to inhibit formation of the by-product N$_2$F$_2$, the period during which NF$_3$ contacts with the active carbon should be extended and also the reaction temperature should be raised to 500° C. or higher. However, even under these conditions it is impossible to completely prevent the formation of the by-product. Further in this case, fluorocarbons such as CF$_4$, C$_2$F$_6$ and the like could be formed also as by-products, which will provide a hazardous mixture with any residual NF$_3$. The mixture tends to detonate sympathetically with N$_2$F$_2$. If the gases to be treated contain O$_2$, the active carbon can be burnt therewith under the process conditions.

The above prior art methods thus do not appear to be feasible in commercial practice.

In industrial applications, NF$_3$ is used in various concentrations appropriate for respective applications. When diluted, an inert gas, typically N$_2$ is used as a diluent.

Depending upon the applications, the waste gases may contain, in addition to any residual NF$_3$, other gaseous substances, for example, acidic fluoride such as HF, SiF$_4$, WF$_6$, MoF$_6$ or the like that are by-products in the respective applications. For example, HF and SiF$_4$ are usually found in waste gas streams from the NF$_3$-dry-etching processes in the VLSI industry.

The prior art methods could not be applied successfully to sweeten the waste gases containing NF$_3$ in combination with acidic gaseous fluoride substances, such as HF, SiF$_4$, MoF$_6$, WF$_6$ or the like.

The present invention seeks to overcome the problems experienced in the prior art methods.

SUMMARY OF THE INVENTION

An object of the invention is to provide a process for treating a gas stream comprising NF$_3$ to remove the NF$_3$ content substantially or completely.

A further object of the invention is to provide a metallic agent useful in such an NF$_3$ removal process.

Another object is to provide a process for treating a gas stream comprising NF$_3$ in combination with any other acidic gaseous fluoride, in which method said gas stream is treated in a sequence of steps to remove the NF$_3$ and other fluoride contents substantially or completely.

Further objects and advantages of the invention will become clear from the following description.

DETAILED DESCRIPTION OF THE INVENTION

The present invention provides a process for removing nitrogen trifluoride, NF$_3$, from a gaseous stream comprising NF$_3$ alone or in combination with other gases, which comprises the step of bringing said gaseous stream into contact with an alloy comprising Cr and Fe to remove the NF$_3$ content substantially or completely. The alloy appears to act as a reducing agent on NF$_3$, forming metal fluorides and nitrogen.

The present invention provides also a process for treating a gaseous stream comprising NF$_3$ in combination with acidic gaseous fluorides, such as HF, SiF$_4$, MoF$_6$ and WF$_6$, which comprises the steps of bringing said gaseous stream into contact first with an alloy comprising Cr and Fe and subsequently with a neutralizing agent to remove the fluoride contents substantially or completely. In a preferred embodiment, the gaseous stream comprising NF$_3$ and acidic gaseous fluorides is contacted first with ribbons of the Cr—Fe-containing alloy at a temperature of about 250° C. or higher to reduce the NF$_3$ and then the NF$_3$-depleted stream is contacted with a neutralizing agent to destroy any residual acidic fluorides.

The Cr—Fe-containing alloy has a Cr content of about 10% or more, preferably about 16–26% and more preferably about 17–23% by weight. The alloy may be brought into contact with the NF$_3$-containing gas stream at a temperature of about 250° C. or higher, preferably in the range of about 300°–600° C., and more preferably about 300°–400° C. The alloy may be conveniently used in the form of ribbons or a similar configuration having, for example, a width of about 1–10 mm and a thickness of less than 0.2 mm. Such dimensions of the alloy would provide a sufficient surface area to facilitate the reactions between NF$_3$ and the alloy and a small pressure loss or pressure drop across the reactor vessel in which the ribbons are charged to be used for the process.

Preferably, the neutralizing agent is selected from alkalis, such as soda lime, NaOH, KOH, CaO, activated alumina and the like. Preferably, the alkalis are employed in the form of pellets.

If the gaseous stream comprising $NF_3$ together with acidic fluorides is contacted first with the neutralizing agent and thereafter with the alloy reducing agent, the $NF_3$ content will react with the neutralizing agent to give NOx including $NO_2$, NO and $N_2O$. When the NOx is then contacted with the alloy reducing agent, only the $NO_2$ can be reduced, but the NO and $N_2O$ tend to remain as such without being reduced and, undesirably, will be carried over into the effluent. Therefore, the sequence of the steps specified in the present invention is effective for treating the mixture gas containing $NF_3$ and other acidic fluoride gases to produce a harmless effluent.

As to the alloy reducing agent, it has been found that Fe-based alloys containing Cr and other elements such as Cu and Al can be useful in the invention. The alloy may contain any incidental elements. Particularly, Fe-based alloys having a Cr content ranging from about 16% to about 26% by weight may be advantageously used in the invention. The alloy is used in the particulate form, preferably in the form of ribbons and packed or charged in a vessel or column through which the $NF_3$-containing gas is passed. The ribbons provide an increased surface area where the $NF_3$ is reduced or converted into harmless products. The alloy ribbons may be packed tight into the treatment column to form a bed having a large effective surface area while causing an acceptable level of pressure drop to take place across the bed. As above-mentioned, the ribbons have preferably a width of about 1–10 mm and a thickness of about 0.2 mm or less.

It has been found that the Cr component in the alloy reacts with $NF_3$ even at relatively low temperatures to form powdery chromium fluoride which will readily come out of the ribbons. On the other hand, the main Fe component in the alloy reacts with $NF_3$ to form iron fluoride which will remain adhering to the ribbons. The form of ribbons will be retained substantially as the fresh ribbons, during and after the process. Therefore, the alloy ribbons will not become completely powdered or collapsed to an extent that a serious blocking problem or a large pressure drop problem is caused to happen in the treatment vessel.

Since the metallic ribbons of the reducing agent according to the invention retain substantially the original physical configuration with the loss of a small amount of fallen powdery substance comprising essentially of chromium fluoride after the useful service life, the replacement of the waste reducing agent with the fresh agent can be facilitated with little or no difficulty.

It has been found that though an Fe-based alloy containing Cr in a concentration of around 10% by weight or more is useful at temperatures of up to about 600° C. in the invention, employment of a Cr concentration of less than about 16% will necessitate the $NF_3$ removal to be effected at relatively high temperatures, say about 500° C. or more, to achieve a practically acceptable efficiency. On the other hand, a Cr content of greater than 26% by weight in the alloy will produce an increased amount of powdery chromium fluoride so that a blocking problem may become conspicuous gradually in the treatment vessel and the replacement of the waste reducing agent may be made somewhat problematic thereby, though such a high Cr content permits employment of a relatively low treatment temperature, for example, 300° C. or less.

Considering the above findings and experiences and also operation costs, the Cr content in the Fe-based alloy used in the invention is desirably at least about 10%, preferably in the range of about 16–26% and more preferably 17–23% by weight.

Examples of commercially available Fe—Cr-containing alloys which may be used in the invention include those belonging to series "SUS-201, 202, 203, 303, 304, 305, 309, 310 and 316" in accordance with JIS (The Japanese Industrial Standard).

The ribbons of the Fe—Cr-containing alloy are preferably packed or charged at a density of about 1.6–2.2 g/cc in the treatment vessel or column. The ribbons or strips may be turnings resulting from lathe working.

The neutralizing agent which may be used in the invention may be selected from solid alkaline chemicals, for example, from the group consisting of soda lime, caustic soda, caustic potassium, calcium oxide, activated alumina and mixtures thereof. Particularly, soda lime or activated alumina or a mixture thereof is preferably used. Usually, the neutralizing agent is employed in the particulate form, especially in the form of pellets to permit the gas stream to pass through a bed formed therewith.

The proportions of the Fe and Cr containing alloy and the neutralizing agent to be charged into a treatment column may be determined depending on analysis of a gas stream to be treated therein. If the gas stream consists of pure $NF_3$ or a mixture of $NF_3$ and an inert gas and if the gas stream contains no noxious gases, such as acidic fluoride gases other than $NF_3$, then the gas stream may be treated in a vessel charged only with the Fe—Cr-containing alloy reducing agent to give a cleaned effluent gas that can be discharged safely into the atmosphere without further treatment.

The term "inert gas" as used herein means, for example, nitrogen or argon that has been used as a diluent gas, or nitrogen that may result from mixing of $NF_3$ with air. The inert gases do not react during the process.

EXAMPLE

The invention will be further illustrated with reference to the following non-limiting Examples.

Example 1

A nickel column having a nominal diameter of 4 inches and a height of 600 mm was charged with 3 kgs of ribbons (5 mm wide; 0.05 mm thick) of a Cr-containing Fe alloy (19% Cr, 9% Ni) to a depth of 400 mm. Then the column was heated by an external heater means to attain a temperature of 400°±30° C. in the central portion of the bed of said charged ribbons. Through the heated column, a gas stream comprising 2% by volume of $NF_3$ and 98% by volume of $N_2$ was passed at a flow rate of 5 liters per minute continuously for a period of 10 hours. At one-hour intervals, samples were taken from the effluent gas stream leaving the column and were analyzed by gas chromatography. Throughout the test period, no gases other than $N_2$ were detectable in the successively taken samples.

Example 2

The general procedure of Example 1 was repeated except that a mixture gas comprising 2.00% $NF_3$, 0.04% HF, 0.60% $SiF_4$, 0.06% $WF_6$ and 97.30% $N_2$, all by volume, was treated in place of the $NF_3/N_2$ mixture gas.

In all the successive samples, $NF_3$ was not detectable. However, on average, 0.34% $SiF_4$ and traces of HF and $WF_6$ were detected.

This suggests that the acidic fluoride-containing gas stream should be treated otherwise.

Example 3

A nickel column as used in Example 1 was charged first with 1.2 kgs of soda lime to a depth of 200 mm and then with 1.8 kgs of ribbons (5 mm wide; 0.05 mm thick) of a Cr-containing Fe alloy (19% Cr, 9% Ni) to a depth of 200 mm on the top of the soda lime bed.

The above-prepared column was used to treat a mixture gas stream comprising 2.00% $NF_3$, 0.04% HF, 0.40% $SiF_4$, 1.60% $WF_6$, 0.005% $NO_2$ and 96% $N_2$ in accordance with the general procedure of Example 1. The gas stream was introduced at a rate of 5 liters per minute downward at the top of said column.

In none of the samples, $NF_3$ and any other acidic fluoride gases were detectable. The effluent gas stream leaving the column was found to comprise substantially pure $N_2$ throughout the test period.

Example 4

A nickel column as used in Example 1 was charged first with 1.4 kgs of NaOH pellets to a depth of 200 mm and then with 1.8 kgs of ribbons (5 mm wide; 0.05 mm thick) of a Cr-containing Fe alloy (19% Cr, 9% Ni) to a depth of 200 mm on the top of the NaOH bed.

The above-prepared column was used to treat a mixture gas stream comprising 2.00% $NF_3$, 0.04% HF, 0.40% $SiF_4$, 1.60% $WF_6$, 0.005% $NO_2$ and 96% $N_2$ in accordance with the general procedure of Example 1. The gas stream was introduced at a rate of 5 liters per minute downward at the top of said column.

Throughout the test period, in the respective samples taken at every one-hour intervals, only $N_2$ was detectable, but $NF_3$ and any other acidic fluoride gases were not detectable.

Example 5

A nickel column as used in Example 1 was charged first with 0.6 kgs of soda lime to a depth of 100 mm, with 0.6 kgs of activated alumina to a depth of 100 mm on the top of said soda lime bed and further with 1.8 kgs of ribbons (5 mm wide; 0.05 mm thick) of a Cr-containing Fe alloy (19% Cr, 9% Ni) to a depth of 200 mm on the top of said activated alumina bed.

The above-prepared column was used to treat a mixture gas stream comprising 3.00% $NF_3$, 0.05% HF, 0.03% $SiF_4$, 1.40% $WF_6$, trace $MoF_6$ and 95.5% $N_2$ in accordance with the general procedure of Example 1. The gas stream was introduced at a rate of 5 liters per minute downward at the top of said column.

Throughout the test period, in the respective samples taken hourly from the effluent, only $N_2$ was detectable, but $NF_3$ and any other acidic fluoride gases were not detectable.

Example 6

A nickel column as used in Example 1 was charged first with a mixture of 0.6 kgs soda lime and 0.7 kgs KOH pellets to a depth of 200 mm and then with 1.8 kgs of ribbons (5 mm wide; 0.05 mm thick) of a Cr-containing Fe alloy (17% Cr, 7% Ni) to a depth of 200 mm on the top of the soda lime/KOH bed.

The above prepared column was used to treat a mixture gas stream comprising 3.00% $NF_3$, 0.05% HF, 0.03% $SiF_4$, 1.40% $WF_6$, trace $MoF_6$ and 95.5% $N_2$ in accordance with the general procedure of Example 1. The gas stream was introduced at a rate of 5 liters per minute downward at the top of said column.

Throughout the test period, in the respective samples taken hourly from the effluent, only $N_2$ was detectable, but $NF_3$ and any other acidic fluoride gases were not detectable.

Comparative Example 1

A nickel column as used in Example 1 was charged first with 1.8 kgs of the Cr-containing Fe alloy as used in Example 1 to a depth of 200 mm and then with 1.2 kgs of soda lime to a depth of 200 mm on the top of the bed of said metallic ribbons.

The above prepared column was used to treat a mixture gas stream comprising 3.00% $NF_3$, 0.05% HF, 0.03% $SiF_4$, 1.40% $WF_6$, trace $MOF_6$ and 95.5% $N_2$ in accordance with the general procedure of Example 1.

The gas stream was introduced at a rate of 5 liters per minute downward at the top of said column.

Samples were taken hourly from the effluent gas stream. On average, 0.2% $NF_3$, 0.6% NO, 0.3% $N_2O$ and 0.07% $NO_2$ were detected in the samples.

In this Example, the bed of metallic ribbons and the alkali bed were disposed in a fashion reverse to that employed in Example 3. As a result, noxious contaminants were found yet in the effluent gas stream.

Comparative Example 2

A nickel column as used in Example 1 was charged with 1.2 kgs of soda lime to a depth of 200 mm and with 1.6 kgs of fibers of iron to a depth of 200 mm on the top of the soda lime bed.

The above prepared column was used to treat a mixture gas comprising 3.00% $NF_3$, 0.05% HF, 0.03% $SiF_4$, 1.4% $WF_6$, trace $MoF_6$ and 95.5% $N_2$ in accordance with the general procedure of Example 1. The gas stream was introduced at a rate of 5 liters per minute downward at the top of the column. Samples were taken hourly and analyzed.

It was found that the temperature of 400° C. as used in Example 1 was too low to enhance the treatment process to an acceptable extent. Where the process was carried out at 400° C. as in the preceding Examples, the treated gas stream contained still a remarkable level of unreacted $NF_3$ due to the low reaction rate at that temperature.

Therefore, the reaction temperature was raised to 500° C. and then the treatment process was allowed to continue. For a while, only $N_2$ was detected, but $NF_3$, other acidic fluoride gases and NOx gases were not detectable in the treated gas stream. However, the pressure drop between the inlet and outlet of the column increased gradually to such an extent that the treatment became difficult to be further effected in about four hours after the raising of temperature to 500° C.

Therefore, when a gas stream containing acidic fluoride gases in addition to $NF_3$, such a gas steam should be treated first with ribbons of alloy comprising Cr and Fe according to the invention and subsequently with an alkaline neutralizing agent (see Examples 3 and 4).

What is claimed is:

1. A process for removing nitrogen trifluoride $NF_3$ from a gaseous stream comprising $NF_3$ alone or in combination with other gases, which comprises the step of bringing said gaseous stream into contact with a reducing agent consisting essentially of an alloy comprising Cr and Fe to remove the $NF_3$ content, said reducing agent being in the form of ribbons having a width of about 1–10 mm.

2. A process as claimed in claim 1, wherein said gaseous stream comprises $NF_3$ in combination with acidic fluoride gases and is brought into contact first with said alloy and subsequently with a neutralizing agent to remove further the fluoride contents.

3. A process as claimed in claim 1, wherein said alloy comprises about 16–26% by weight of Cr.

4. A process as claimed in claim 2, wherein said acidic fluoride gases comprise at least one selected from HF, $SiF_4$, $WF_6$ and $MoF_6$.

5. A process as claimed in claim 4 wherein said neutralizing agent comprises at least one selected from soda lime, caustic soda, caustic potassium, calcium oxide and activated alumina and in the form of pellets.

6. A process as claimed in claim 3 wherein said alloy ribbons are used in a form of bed packed to a density of about 1.6–2.2 g/cc.

7. A process as claimed in claim 1 wherein said contact is effected at a temperature in the range of about 300°–600° C.

8. The process as claimed in claim 1, wherein said reducing agent consists essentially of an Fe-based alloy containing about 10 to 26% by weight of Cr.

9. The process as claimed in claim 8 wherein said bons have a thickness of less than about 0.2 mm.

10. A process as claimed in claim 2, wherein said alloy comprises about 16–26% by weight of Cr.

11. A process as claimed in claim 10, wherein said neutralizing agent comprises at least one selected from soda lime, caustic soda, caustic potassium, calcium oxide and activated alumina and in the forms of pellets.

12. In a process for removing nitrogen trifluoride $NF_3$ from a gaseous stream comprising $NF_3$ alone or in combination with other gases, comprising the step of contacting said gaseous stream with a metallic reducing agent at an elevated temperature, the improvement wherein said metallic reducing agent consists essentially of an alloy of Fe containing at least 10% and up to 26% by weight of Cr.

13. A process in accordance with claim 12, wherein said alloy comprises 16–26% by weight of Cr in the form of strips having a width of about 1–10 mm.

14. A process in accordance with claim 13, wherein said contact is effected at a temperature in the range of about 300°–500° C.

15. A process as claimed in claim 12, wherein said contact is effected at a temperature in the range of about 300°–600° C.

16. A process in accordance with claim 13, wherein said alloy strips are packed in a bed to a density of about 1.6–2.2 g/cc.

17. A process in accordance with claim 16, further comprising subsequently passing said gaseous stream into contact with a neutralizing agent.

18. A process in accordance with claim 12, further comprising subsequently passing said gaseous stream into contact with a neutralizing agent.

* * * * *